US009021598B1

(12) United States Patent
Myers et al.

(10) Patent No.: US 9,021,598 B1
(45) Date of Patent: Apr. 28, 2015

(54) MANAGING APPLICATION EVENTS

(75) Inventors: Steven Duane Myers, Lee's Summit, MO (US); Terry Gene Rayburn, Kansas City, MO (US); Raymond Emilio Reeves, Olathe, KS (US); Ryan Alan Wick, Punta Gorda, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 1761 days.

(21) Appl. No.: 12/359,077

(22) Filed: Jan. 23, 2009

(51) Int. Cl.
*H04L 29/06* (2006.01)
*G06F 21/00* (2013.01)
*G06F 15/16* (2006.01)
*G06F 19/00* (2011.01)

(52) U.S. Cl.
CPC ............... *G06F 15/16* (2013.01); *G06F 19/00* (2013.01)

(58) Field of Classification Search
CPC .................................. G06F 15/16; G06F 19/00
USPC ...................... 726/26, 2; 709/203, 27; 700/16; 345/173; 463/41; 715/738; 705/59
See application file for complete search history.

(56) References Cited

U.S. PATENT DOCUMENTS

| | | | |
|---|---|---|---|
| 2002/0065780 A1* | 5/2002 | Barritz et al. ................ 705/59 |
| 2006/0270478 A1* | 11/2006 | Barhydt et al. .............. 463/41 |
| 2007/0061867 A1* | 3/2007 | Shinohara et al. ............ 726/2 |
| 2007/0225830 A1* | 9/2007 | Shimura et al. .............. 700/16 |
| 2009/0049554 A1* | 2/2009 | Vuong et al. ................. 726/26 |
| 2009/0055749 A1* | 2/2009 | Chatterjee et al. ........... 715/738 |
| 2010/0023582 A1* | 1/2010 | Pedersen et al. ............ 709/203 |
| 2010/0235261 A1* | 9/2010 | Lloyd et al. .................. 705/27 |
| 2011/0227857 A1* | 9/2011 | Chaudhri ..................... 345/173 |

FOREIGN PATENT DOCUMENTS

WO   WO 2006079867 A1 *  8/2006

OTHER PUBLICATIONS

Rocha, B.P.S.; Rezende, C.G.; Loureiro, A.A.F.; "Middleware for multi-client and multi-server mobile applications"; Wireless Pervasive Computing, 2007. ISWPC '07. 2nd International Symposium on DOI: 10.1109/ISWPC.2007.342643; Publication Year: Aug. 2007; pp. 437-441.*

* cited by examiner

*Primary Examiner* — Kambiz Zand
*Assistant Examiner* — Courtney Fields

(57) ABSTRACT

Systems, methods, and computer-readable media for managing application events are provided. In embodiments, a notifier is received that indicates a usage of an application installed on a user device and a date associated with the usage. A verification notifier is also received that verifies that the user device is registered in association with the application and indicates a date associated with the verification. The date associated with the usage and the date associated with the verification are compared to determine whether the dates occur within a predetermined time period relative to one another. In such a case, it might be determined that a provider of the application installed on the user device should be rewarded.

16 Claims, 4 Drawing Sheets

MANAGING APPLICATION EVENTS

SUMMARY

Embodiments of the invention are defined by the claims below, not this summary. A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

In a first aspect, a set of computer-useable instructions providing a method for managing application events is illustrated. The method includes receiving a notifier that indicates a usage of an application installed on a user device and a date associated with the usage. A verification notifier is received. The verification notifier verifies that the user device is registered in association with the application and indicates a date associated with the verification. The date associated with the usage and the date associated with the verification are compared to determine that the dates occur within a predetermined time period relative to one another.

In other embodiments, a set of computer-useable instructions providing a method for managing application activations is illustrated. The method includes launching an application installed on a mobile device. It is determined that the application being launched on the mobile device is being launched for the first time. Accordingly, a notifier that indicates an occurrence of an initial launch of the application on the mobile device is generated.

In still further embodiments, a system for managing application activations is illustrated. The system includes a user device for generating and communicating a first notifier upon an occurrence of an application event associated with usage of an application installed on the user device that uses a wireless telecommunications network. The first notifier provides an indication of the application event. The system also includes a verifying component for generating and communicating a second notifier upon verifying that the user device is registered in association with the application. The second notifier provides an indication of the verification. The system further includes a counting component for receiving and recording the first notifier and the second notifier.

BRIEF DESCRIPTION OF THE SEVERAL VIEWS OF THE DRAWING

Illustrative embodiments of the present invention are described in detail below with reference to the attached drawing figures, and wherein.

DETAILED DESCRIPTION

Figure 1:
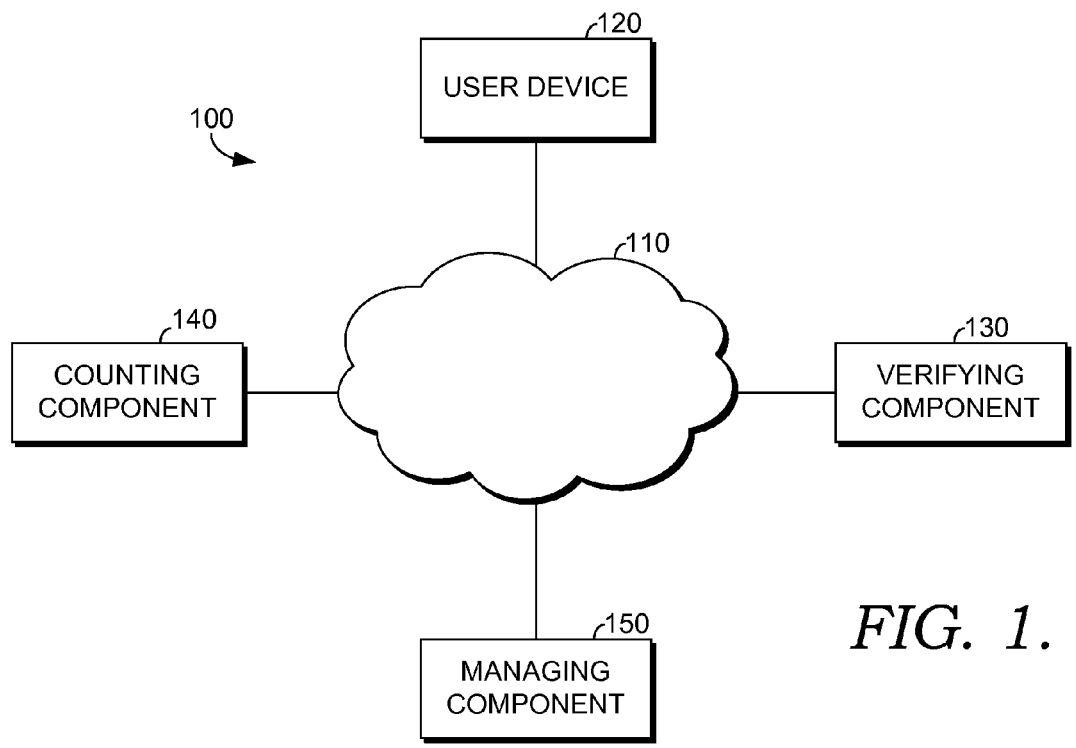
FIG. 1 is a block diagram of an exemplary system for managing application events, in accordance with an embodiment of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" or "module" etc. might be used herein to connote different components of methods or systems employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated embodiments. These acronyms and shorthand notations are solely intended for the purpose of providing an easy methodology of communicating the ideas expressed herein and are in no way meant to limit the scope of the present invention. The following is a list of these acronyms:

| | |
|---|---|
| CD-ROM | Compact Disk Read Only Memory |
| DVD | Digital Versatile Discs |
| EEPROM | Electrically Erasable Programmable Read Only Memory |
| IP | Internet Protocol |
| LAN | Local Area Network |
| MDN | Mobile Directory Number |
| PC | Personal Computer |
| PDA | Personal Digital Assistant |
| RAM | Random Access Memory |
| ROM | Read Only Memory |
| WAN | Wide Area Network |

Embodiments of the present invention may be embodied as, among other things, a method, system, or a computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Referring to the drawings generally, and initially to FIG. 1 in particular, an exemplary system 100 for managing application events is illustrated. An application event, as used herein, refers to any event associated with or corresponding with usage of an application in association with a user device. In this regard, an application event might be an installation event, an application-activation event, a device-activation event, a verification event, an execution event, a deactivation event, or the like. An installation event refers to an installation of an application on a user device. An application-activation event refers to an initial execution, run, or launch of an application on a user device. A device-activation event refers to a registration of a user device with a network provider that provides a network service. A verification event refers to a verification that a user device, or user associated therewith, is registered in association with an application or an application provider associated therewith. That is, a verification event verifies that a user or user device is a valid user of an application or provider thereof. An execution event refers to an execution, run, or launch of an application that occurs after an initial execution, run, or launch (i.e., an application-activation event). A deactivation event refers to a deactivation of an application (e.g., uninstalling an application) or a service associated therewith (e.g., cancelling a service associated with an activation).

Managing such application events enable an identification of application usage associated with a user or user device. As such, a network provider (i.e., a provider of network services that are used to operate a user device), a device provider (i.e., a provider of a user device), and/or an application provider (i.e., a provider of an application) can monitor events associated with usage of an application on a user device. By way of example only, a network provider might be able to recognize a date of an application-activation event relative to a date of a verification event and utilize such information to predict whether a user's selection of a device or a service provider for the device is related to a particular application. Stated differently, it can be predicted whether a user purchased a device or network service based on, at least in part, an ability to utilize a specific application with the device and/or network services. Such information might be valuable in, for example, determining whether to include or enable an application to operate in connection with a user device or a network service, whether to provide a reward or incentive to an application provider that provides a particular application, how much to provide as a reward or incentive, or the like. One skilled in the art will appreciate that managing activation events can enable a calculation, identification, prediction, or determination of any information associated with usage of an application.

As shown in FIG. 1, an exemplary system 100 includes a network 110, a user device 120, a verifying component 130, a counting component 140, and a managing component 150. The user device 120, the verifying component 130, the counting component 140, and the managing component 150 communicate via a network, depicted generally by the numeral 110. Network 110 could be wired, wireless, or both. Network 110 can include multiple networks, as well as being a network of networks, but is shown in more simple form so as to not obscure the other aspects of the present invention. For example, network 110 may include one or more wide area networks (WANs), one or more local area networks (LANs), one or more public networks, such as the Internet, and/or one or more private networks. In one embodiment, network 110 includes at least a portion of a wireless telecommunications network provided by a wireless telecommunications network service provider. Network 110 might include an array of devices, which are not shown so as to not obscure more relevant aspects of the invention. In a wireless telecommunications network, components such as a base station, a communications tower, or even access points (as well as other components) can provide wireless connectivity in some embodiments. Although single components are illustrated for clarity, one skilled in the art will appreciate that network 110 can enable communication between multiple user devices, validating components, counting components, and/or managing components.

The user device 120 can be any device capable of executing an application and communicating one or more notifiers. Accordingly, the user device 120 may take on a variety of forms, such as a personal computer (PC), a laptop computer, a mobile phone, a personal digital assistant (PDA), a server, or any other device that is capable of executing an application and communicating a notifier. In one embodiment, the user device 120 is a mobile device registered or under contract with a wireless telecommunications network provider that provides wireless services to enable the user device to communicate wirelessly.

An application resides on or is integrated with the user device 120. An application, as used herein, refers generally to application software including word processors, spreadsheets, media players, database applications, a bundle of applications known as an application suite, web applications, and the like. Applications may be associated with an application identifier which uniquely identifies a particular application. The application identifier is useful for identifying a specific application associated with a notifier, as is discussed in greater detail below. An application identifier may be in the form of numerals, text, symbols, or any other characters that indicate an application.

A user device can acquire an application in any number of ways. For example, an application might be downloaded from an application provider or provided via peer-to-peer acquisition. Such acquisitions might occur prior to or following a user's purchase or registration of a user device. Alternatively, a user device might be acquired with a pre-loaded application.

The user device 120 generates one or more notifiers associated with usage of an application. In embodiments, a notifier is generated upon, or coinciding with, an occurrence of an activation event. In such an embodiment, the user device might recognize an occurrence of an activation event prior to generating a corresponding notifier. The user device 120 might generate a corresponding notifier depending on the recognized activation event. For example, an installation event will be associated with a different notifier than a deactivation event. Upon generating one or more notifiers, the user device 120 communicates the one or more notifiers. In embodiments, the user device 120 communicates notifiers to a counting component, such as counting component 140. A notifier, as used herein, refers to a notification message (e.g., a packet) that provides an indication of an application event. Accordingly, a notifier includes an indication of a type of application event. In this regard, an installation notifier is a notifier that includes an indication of an occurrence of an installation event. An application-activation notifier is a notifier that includes an indication of an occurrence of an application-activation event. A device-activation notice is a notifier that includes an indication of an occurrence of a device-activation event. A verification notifier is a notifier that includes an indication of an occurrence of a verification event. An execution notifier is a notifier that includes an indication of an occurrence of a execution event. A deactivation notifier is a notifier that includes an indication of an occurrence of a deactivation event.

As can be appreciated, a notifier might include other information pertaining to an activation event. A notifier might include, by way of example and not limitation, an application identifier, a source identifier, a source type, an event date, an event time, a user identifier, or the like. An application identifier is a unique identifier that corresponds with a specific application. Accordingly, an application identifier can be used to identify a specific application associated with an application event. A source identifier is a unique identifier that corresponds with a source communicating a notifier. A source communicating an identifier might be, for example, the user device 120, the verifying component 130, or other device or component. A source identifier may include a serial number of the source (e.g., mobile device or server), a mobile directory number (MDN), an IP address, or the like. A source type provides an indication of the type of source that is used to communicate a notifier. For example, a source type might indicate that the source providing a notifier is a user device (i.e., a device used by a user) or a verifying component (a computing device managed by an application provider). An event date provides an indication of a date an application event occurred and an event time provides an indication of a time an application event occurred. An event date and/or event time may be a precision time stamp within a period of time (e.g., one second) of an application event that initiates generation and/or communication of a corresponding notifier. A user identifier is a unique identifier that corresponds with a specific user. Accordingly, a user identifier can be used to identify a specific user associated with an application event.

In one embodiment, communication of a notifier might be initiated by an occurrence of an application event. That is, a particular notifier might be communicated to a counting component upon an occurrence of an application event. By way of example only, upon a user device 120 executing an application for the first time, the user device 120 might communicate an application-activation notifier. Similarly, upon launching an application that had been previously launched, the user device 120 might communicate an execution notifier. As a further example, upon uninstalling an application from a user device, the user device 120 might communicate a deactivation notifier.

In an alternative embodiment, communication of a notifier (s) might occur upon an occurrence of a non-activation event or a lapse of a time or time period. For example, in one implementation, a user device might communicate one or more notifiers based on a user indication to generate and/or communicate a notifier provided via the user device, a powering on of the user device, an established connection between the user device and a network provider, or the like. In another implementation, a user device might communicate one or more notifiers upon a lapse of a time. That is, notifiers might be communicated once a day to a counting component. It can be appreciated that such notifiers might be stored within the user device.

The user device 120 might recognize an application event, generate a notifier, and/or communicate a notifier in accordance with code developed and included within an application residing on a user device, such as an application for which application events are being monitored, or within an operating system of the user device. Accordingly, the user device 120 might be configured to generate and/or communicate particular notifiers. For example, in one embodiment, a user device might only generate and communicate an application-activation notifier. As such, upon recognizing an application-activation event, the user device generates an application-activation notifier and communicates the notifier to an appropriate counting component. Additionally or alternatively, the user device might be configured to limit the types of application events that initiate communication of a notifier after an initial launch of an application. For example, a notifier might be initiated for each run of an application on a daily basis or initiated every three times an application is launched.

The user device 120 initiates verification that a user device, or a user associated therewith, is registered in association with an application or an application provider associated therewith. Such verification allows a user or user device to be verified as a valid or registered user or device of an application or provider thereof. In some embodiments, initiating verification of a user or user device might occur based on a user indication. By way of example, upon launching an application, a user might select to log in or register. Upon entering information, such as login information, a verification request that provides an indication to verify the user or user device might be generated and communicated to the verifying component 130. In other embodiments, initiating verification of a user or user device might occur upon launching an application. For example, a user device might automatically generate and communicate a verification request to the verifying component 130 in order to be verified as a valid user or user device when an application is launched. One skilled in the art will appreciate that such initiation of a user device or user verification might occur a single time (e.g., the first time an application is utilized) or any number of times (e.g., each instance the application is utilized). A verification request might include, for example, an application identifier, a source identifier, a source type, an event date, an event time, a user identifier, or the like.

The verifying component 130 can be any computing device, or portion thereof, capable of verifying that a user or user device is registered in association with an application or an application provider. As such, the verifying component 130 may take on a variety of forms, such as a personal computer (PC), a laptop computer, a mobile phone, a personal digital assistant (PDA), a server, or any other device that is capable of verifying validity of a user. In one embodiment, the verifying component 130 is a server of an application provider that provided the application for which registration is being verified.

The verifying component 130 verifies that a user or user device is registered in association with an application or a provider thereof. That is, the verifying component 130 determines whether a user or user device is a valid user or user device of an application or services provided by an application provider. The verifying component 130 might utilize a lookup system or an algorithm to perform such a verification. For example, a list of users and/or user devices that have paid a registration fee, or otherwise properly registered, might be contained in a database accessible by the verifying component 130.

Upon verification, the verifying component 130 generates one or more notifiers, including a verification notifier. In embodiments, a verification notifier is generated upon, or coinciding with, an occurrence of a verification event. In such an embodiment, the verifying component 130 might recognize an occurrence of a verification event prior to generating a corresponding verification notifier. As previously discussed, a verification notifier might include, for example, an application identifier, a source identifier, a source type, an event date, an event time, a user identifier, or the like. The verifying component 130 might obtain such information from a database accessible by the verifying component 130, a verification request communicated from the user device 120, or the like.

Upon generating a verification notifier, the verifying component 130 communicates the verification notifier. In embodiments, the verifying component 130 communicates the verification notifier to a counting component, such as counting component 140. In alternative embodiments, communication of a verification notifier might occur upon an occurrence of a lapse of time or time period. For example, in one implementation, a verifying component might communicate one or more verification notifiers upon a lapse of time. That is, verification notifiers may be communicated once a day to a counting component. In another implementation, a verifying component might communicate a verification notifier based on a user indication to generate and/or communicate a verification notifier, an established connection between the verifying component and a network provider, or the like.

The verifying component 130 might recognize an application event, generate a notifier, and/or communicate a notifier in accordance with code developed and included within the verifying component 130, an application residing within the verifying component 130, or the like. Accordingly, the verifying component 130 might be configured to generate and/or communicate particular notifiers. For example, in one embodiment, a verifying component might generate and communicate a verification notifier. In such an example, upon receiving a verification request and performing a verification, the verifying component generates a verification notifier and communicates the notifier to an appropriate counting component. Alternatively, a verifying component might also generate a notifier upon receiving a verification request and determining the user or user device is not a valid user or user device. In such a case, the notifier might include an indication that a verification cannot be confirmed.

The counting component 140 receives and records notifiers, or portions thereof. The counting component 140 can be any computing device, or portion thereof, capable of receiving and recording notifiers. In embodiments, the counting component 140 is a server of a network provider (e.g. a wireless telecommunications network provider). Upon receiving one or more notifiers, for example, transmitted from a user device and/or a verifying component, the counting component 140 records the notifier, a portion thereof, or information associated therewith. In embodiments, the counting component 140 may be configured to recognize the type of notifiers such that a flag may be associated therewith. A flag, as used herein, refers generally to any designation of a notifier. For instance, if a notifier received is a verification notifier or an application-activation notifier, the counting component 140 may record a flag for the notifier, while the counting component 140 may not record a flag for an execution notifier. Flagging notifiers may enable a user or computing device (e.g. a counting component or managing component) to easily identify specific notifiers communicated for a specific application. One of ordinary skill will also appreciate that various components of system 100 may be configured to flag various notifiers.

In some embodiments, each notifier received by the counting component 140 is stored within a database. Alternatively, the counting component 140 may store only flagged notifiers in a database. The counting component 140 can communicate notifiers, or portions thereof, to a managing component, such as managing component 150.

The managing component 150 recognizes and analyzes notifiers or portions thereof. The managing component 150 can be any computing device capable of calculating, identifying, predicting, or determining any information associated with usage of an application. As such, the managing component 150 may take on a variety of forms, such as a personal computer (PC), a laptop computer, a mobile phone, a personal digital assistant (PDA), a server, or any other device that is capable of calculating a compensation. In one embodiment, the managing component 150 is a server of a network provider (e.g. a wireless telecommunications network provider).

The managing component 150 references one or more notifiers. In this regard, the managing component 150 might receive, obtain, or retrieve such notifiers from a counting component. Upon referencing a notifier, the managing component 150 can identify the notifier based on the information associated therewith, including a source identifier, a source type, a user identifier, an application identifier, a notifier type, or the like. By way of example, the managing component 150 identifies the application associated with the notifier by way of the application identifier. In embodiments, the managing component 150 may be configured to recognize the type of notifier such that a flag may be associated therewith. For instance, the managing component 150 may be configured to associate a flag with a specific notifier. Thus, the managing component 150 may flag an activation notifier but not an execution notifier. In another embodiment, managing component 150 may be configured to recognize flags associated with a notifier by another component of system 100. For example, counting component 140 may record a flag for an activation notifier, and managing component 150 may recognize the flagged notifier.

Upon identification of a notifier, the managing component 150 may compare two or more notifiers or the information associated therewith. For example, an event date and/or an event time associated with one notifier may be compared to an event date and/or an event time associated with a different notifier. Such a comparison might be performed, for example, at a definable interval or an occurrence of an event (e.g., receipt of particular notifier(s) associated with an application). A definable interval may be configured to be any interval suitable to a user or program developer and may be based on preference or business methods. For instance, a user or user device that generates and/or communicates a high volume of notifiers may require an interval of a day whereas a second user or user device that generates and/or communicates very few notifiers may only require a weekly interval. In some embodiments, the managing component 150 may compare the event date and/or the event time associated with a verification notifier relative to the event date and/or the event time associated with an application-activation notifier. In other embodiments, the managing component 150 might compare an account-activation date with a date associated with a notifier. An account-activation date, as used herein, refers generally to the date associated with the activation of an account with a network service provider. Such information may be used, as previously discussed, to predict whether a user's selection of a device or a network service provider is related to a particular application.

Upon a comparison of the notifiers or information associated therewith, the managing component 150 determines if a correlation, or a correlative relationship, is present. A correlation can be recognized if the compared information is within a previously designated range relative to one another. For instance, assume that an application-activation notifier is compared to a verification notifier, and it is recognized that the notifiers indicate that the corresponding events occurred ten days apart. Further assume that a predetermined time duration of one month is utilized to determine whether a correlation between the notifiers exists. In such a case, a correlation is recognized as the two events occur within the predetermined time duration. The designated range may be configured by a user or program developer in accordance with preferences or best practices. For instance, the designated range may be a number of days or may be as little as a number of hours. For example, the designated range may be such that an activation of an account with a network service provider, purchase of a user device, or the like is said to be in part because of the application(s) activated by the user device.

When a correlation is recognized, the managing component 150 analyzes the correlation and determines whether to assign a credit, incentive, or reward to the application or the provider thereof. If a credit should be assigned to the application or provider thereof, a compensation value can be calculated. Alternatively, a predetermined credit can be applied to or provided to an application provider. The recognition of such correlations and subsequent crediting allow the tracking of application(s) usage and provides credits or incentives to the application(s) proving to be advantageous. One of ordinary skill in the art will appreciate that various components of system 100 may be configured to assign a credit or incentive to a correlation and calculate a compensation value.

Those skilled in the art will appreciate that the present invention contemplates the presence of additional components and/or subcomponents of the system 100, and the components and/or subcomponents may be combined with one another and/or separated into new components and subcomponents. By way of illustration, and not limitation, the system 100 could be embodied without a separate managing component 150. In such a case, functions performed by the managing component 150 might be performed by the counting component 140 or any other component.

Figure 2:
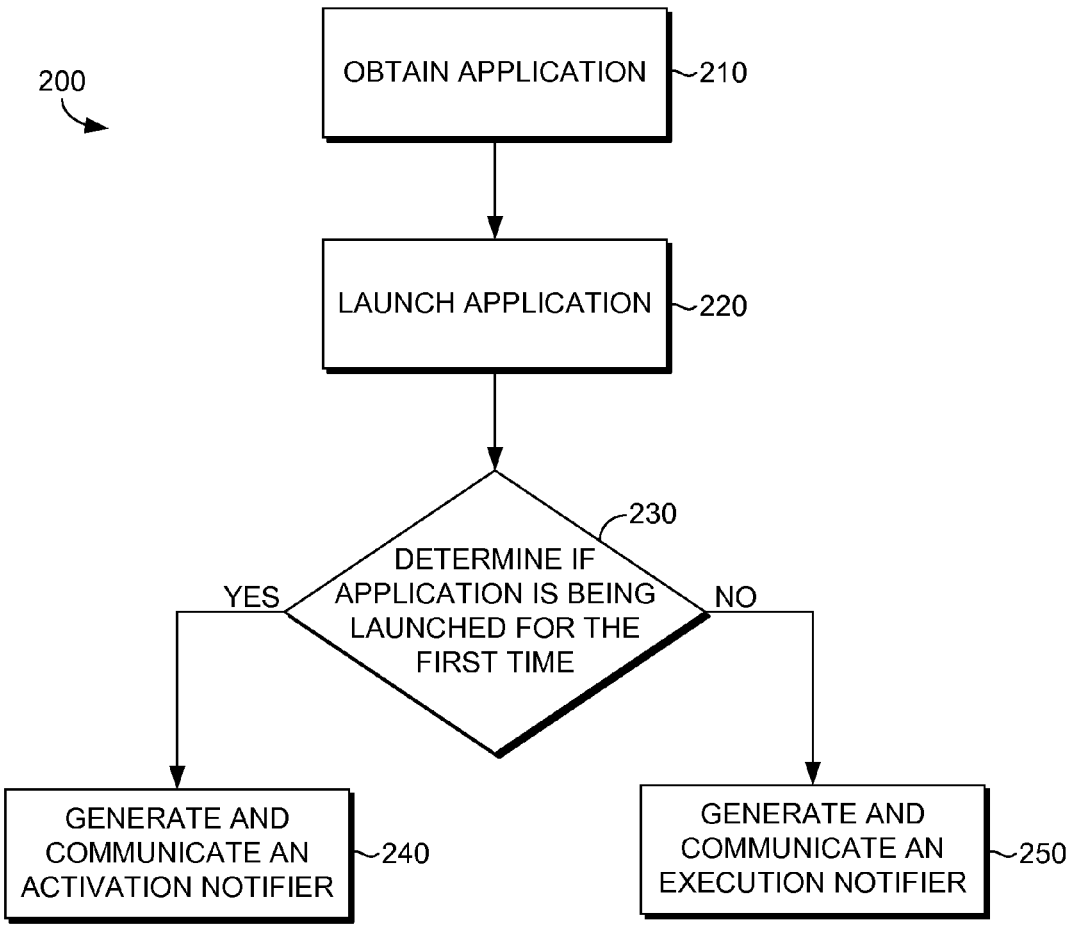
FIG. 2 is a flow diagram illustrating an exemplary method for transmitting a notifier from a user device, in accordance with an embodiment of the present invention.

An exemplary method 200 for transmitting a notifier from a user device is illustrated in FIG. 2. Initially, as indicated at block 210, an application is obtained on a user device. The application includes or is associated with an application identifier that identifies a specific application. The application can be obtained by any means known in the art including downloading the application from a provider, acquiring pre-loaded applications, peer-to-peer transfers, and the like.

At some point following the application being obtained on the user device, the application is launched. This is indicated at block 220. A determination of whether the application is being launched for the first time is made at block 230. If it is determined that the application is being launched for the first time, an application-activation notifier is generated and communicated at block 240. Such an application-activation notifier may be communicated to a counting component, such as counting component 140, and may contain an application identifier, a source identifier, a source type, an event date, an event time, a user identifier, or the like. If, however, it is determined that the application is not being launched for the first time, an execution identifier is generated and communicated at block 250. The execution notifier may be communicated to a counting component. The execution notifier might include, for example, an application identifier, a source identifier, a source type, an event date, an event time, a user identifier, or the like.

Figure 3:
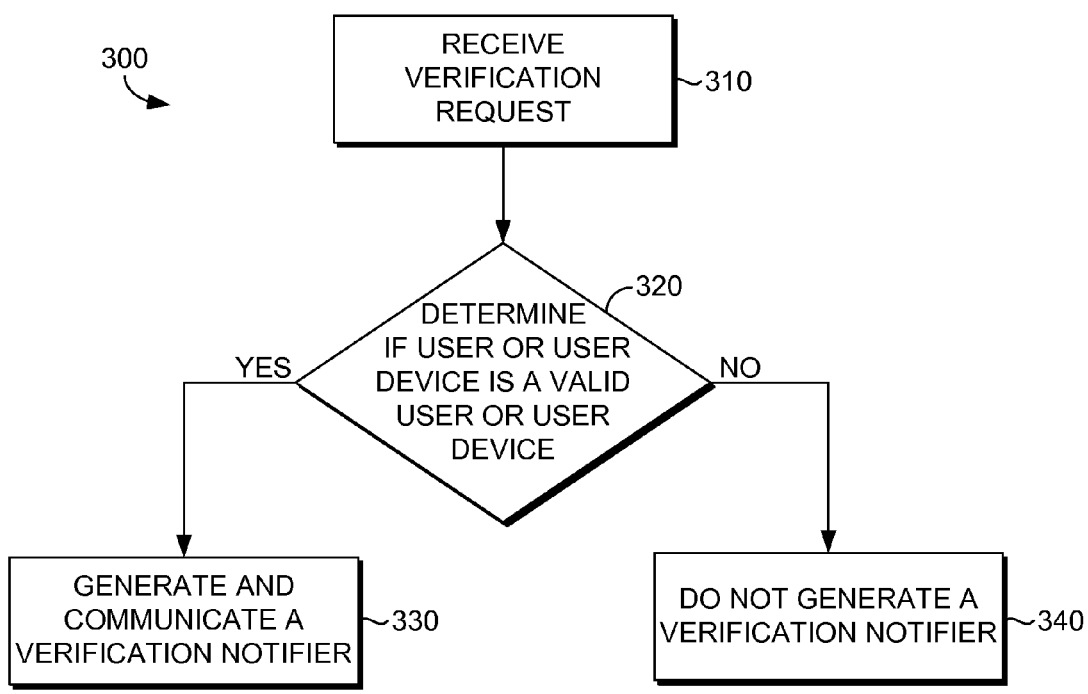
FIG. 3 is a flow diagram illustrating an exemplary method for transmitting a notifier from a verifying component, in accordance with an embodiment of the present invention.

An exemplary method 300 for transmitting a notifier from a verifying component is illustrated in FIG. 3. Initially, a verification request is received at block 310. A verification request might be communicated from a user device, and might include, for example, an application identifier, a source identifier, a source type, an event date, an event time, a user identifier, or the like. The verification request seeks to validate that a user device, or a user associated therewith, is registered in association with an application or an application provider. Such a verification request allows a user or user device to be verified as a valid or registered user or device of an application or provider thereof. In some embodiments, initiating verification of a user or user device might occur based on a user indication. By way of example, upon launching an application, a user might select to log in or register. Upon entering information, such as login information, a verification request that provides an indication to verify the user or user device might be generated and communicated to the verifying component 130. In other embodiments, initiating verification of a user or user device might occur upon launching an application. For example, a user device might automatically generate and communicate a verification request to the verifying component 130 in order to be verified as a valid user or user device when an application is launched. One skilled in the art will appreciate that such initiation of a user device or user verification might occur a single time (e.g., the first time an application is utilized) or any number of times (e.g., each instance the application is utilized).

Upon receiving the verification request, a determination is made whether the user or user device is a valid user or user device at block 320. A lookup system or an algorithm might be used to perform such a determination regarding verification. For example, a list of users and/or user devices that have paid a registration fee, or otherwise properly registered, might be contained in a database accessible by a verifying component.

If the user or user device is determined to be a valid user or user device, it is verified and a verification notifier is generated and communicated at block 330. In embodiments, a verification notifier is generated upon, or coinciding with, an occurrence of a verification event. As previously discussed, a verification notifier might include, for example, an application identifier, a source identifier, a source type, an event date, an event time, a user identifier, or the like. In embodiments, the verification notifier is communicated to a counting component, such as counting component 140. If, on the other hand, the user or user device is not determined to be a valid user or user device, the verification request is not verified and no verification notifier is communicated, as illustrated at block 340. In some embodiments, rather than failing to send a verification notifier that confirms a valid user or user device, a notifier that indicates a failed verification might be transmitted.

Figure 4:
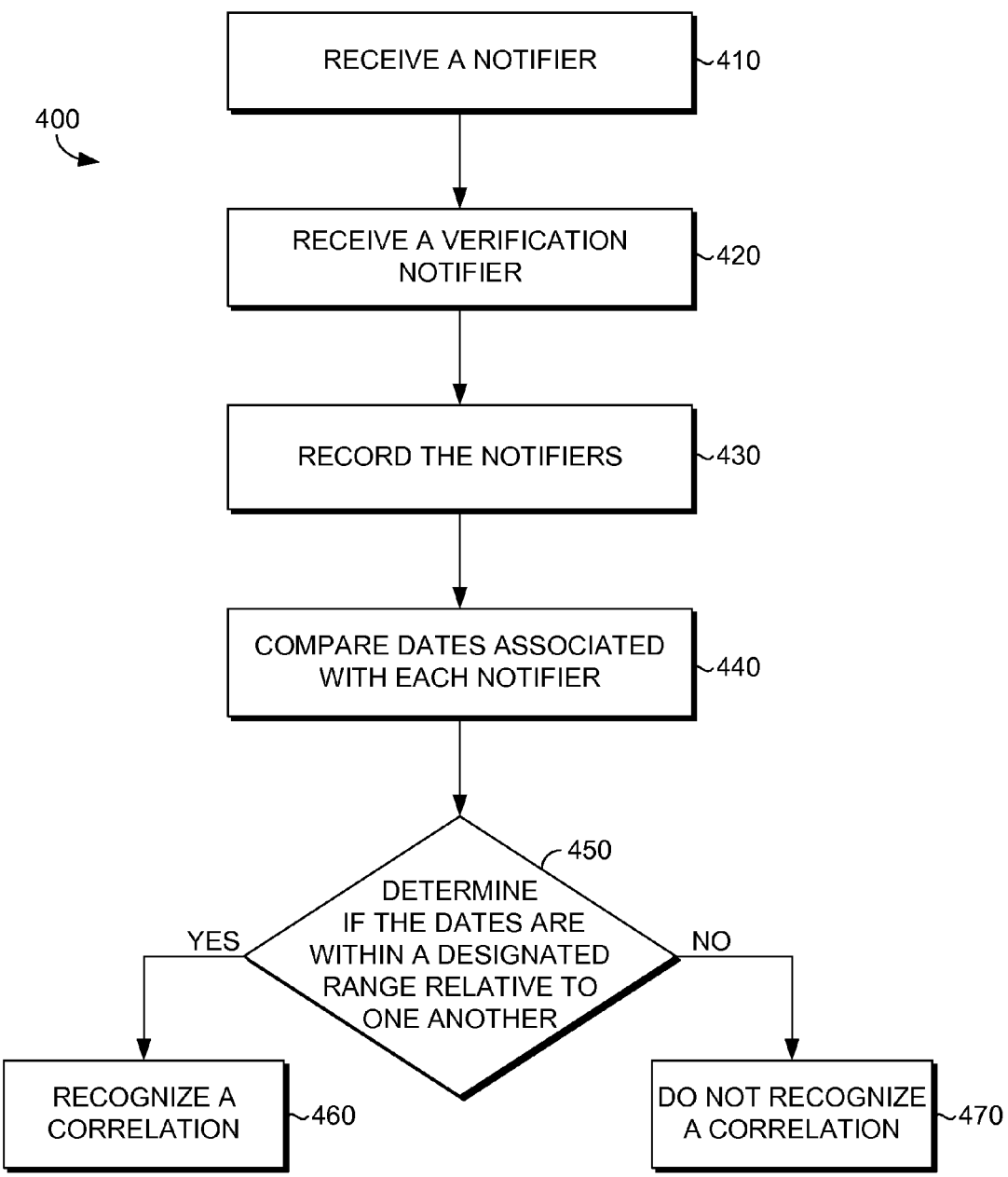
FIG. 4 is a flow diagram illustrating an exemplary method for managing application events, in accordance with an embodiment of the present invention.

An exemplary method 400 for managing application events is illustrated in FIG. 4. Initially, a notifier is received at block 410. The notifier might be communicated from a user device and includes, for example, a date and/or of the application event, a source identifier that identifies the source communicating the notifier, a source type that identifies the type of source communicating the notifier, and the like. A notifier may also include a notifier type identifying the notifier as an installation notifier, an execution notifier, a deactivating notifier, an application-activation notifier, a device-activation notifier, or the like. The notifier may be identified as an application-activation notifier if the application is being launched for the first time. Alternatively, the notifier may be identified as an execution notifier, a deactivating notifier, or the like. The notifier can be associated with an application identifier that identifies the specific application related to the notifier. The communicated notifier, and information associated therewith, depends on the application event recognized.

A verification notifier is received at block 420. A verification notifier might be communicated from a verifying component and includes, for example, a date and/or time of the verification, a source identifier that identifies the source communicating the notifier, a source type that identifies the type of source communicating the notifier, an application identifier, and the like. The source identifier may include, for example, a serial number of the source (e.g., mobile device or server), a MDN, an IP address, or the like. A source type provides an indication of the type of source that is used to communicate a notifier.

The notifiers are recorded at block 430. Various embodiments include recording a flag for a notifier depending on the identification of the notifier(s). For instance, if a notifier is identified as an application-activation notifier, a flag may be recorded for the notifier. If a notifier is identified as a verification notifier, a flag may be recorded for the notifier. However, if the notifier is identified as an execution notifier, a flag may not be recorded for the notifier.

The event dates and/or event times associated with each notifier are compared at block 440. At block 450, a determination is made whether the dates and/or times are within a previously designated range relative to one another. If the dates are within a previously designated range relative to one another, a correlation is recognized is recognized at block 460. Upon recognizing a correlation, a compensation rate can be calculated and/or a credit can be assigned to the notifier. If, however, the dates are not within a previously designated range, no correlation is recognized at block 470.

From the foregoing, it will be seen that this invention is one well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. One or more computer-readable media not being a signal per se having computer-useable instructions embodied thereon for performing a method for managing application events, the method comprising:
    receiving at a network provider, a first notifier having a date associated with the first notifier, the first notifier indicates a usage of an application installed on a user device;
    receiving at the network provider, a second notifier having a date associated with the second notifier;
    determining if the date associated with the first notifier and the date associated with the second notifier are within a predetermined time period relative to one another based on comparing the date associated with the first notifier and the date associated with the second notifier;
    determining a credit to apply to a provider of the application, from the network provider, when the date associated with the first notifier and the date associated with the second notifier are within the predetermined time period relative to one another, wherein the network provider supports the application of the provider via the user device on a network service of the network provider; and
    applying the credit from the network provider, to the provider of the application.

2. The media of claim 1, wherein the first notifier is an application-activation notifier that indicates an initial execution of the application on the user device.

3. The media of claim 1, wherein the second notifier is a verification notifier that verifies that the user device is registered in association with the application.

4. The media of claim 1, wherein the second notifier is a device-activation notifier that indicates a registration of the user device with the network provider that provides a network service used by the user device.

5. The media of claim 1, wherein the first notifier includes an application identifier that identifies the application, a source identifier that identifies the user device, and a usage type that indicates the type of usage of the application installed on the user device.

6. One or more computer-readable media not being a signal per se having computer-useable instructions embodied thereon for performing a method for managing application events, the method comprising:
    launching an application installed on a mobile device that is supported by a network provider that provides network service used by the mobile device,
    determining that the application is being launched on the mobile device for a first time; and
    generating a notifier that indicates an occurrence of an initial launch of the application on the mobile device, wherein the notifier and a corresponding verification notifier that validates that the mobile device is registered in association with the application are used to calculate a compensation to apply to a provider of the application, wherein the compensation is from the network provider that provides a network service used by the mobile device.

7. The media of claim 6 further comprising communicating the notifier to a counting component that receives the notifier from the mobile device and a notifier from a verifying component used to validate that the mobile device is registered in association with the application.

8. The media of claim 7, wherein the counting component records the received notifiers.

9. The media of claim 8, wherein the counting component communicates the notifiers to a managing component that compares the notifier received from the mobile device and the notifier received from the verifying component.

10. The media of claim 9, wherein the managing component identifies that the notifiers correspond with one another and calculates the compensation to apply to the provider of the application.

11. The media of claim 6, wherein the notifier includes an application identifier, a source identifier, a source type identifier, an event date, an event time, or a combination thereof.

12. A system for managing application events, the system comprising:
    a user device, that is supported by a network provider that provides a wireless telecommunications network used by the mobile device, the user device generates and communicates a first notifier upon an occurrence of an application event associated with usage of an application installed on the user device that uses the wireless telecommunications network, the first notifier providing an indication of the application event;
    a verifying component that generates and communicates a second notifier upon verifying that the user device is registered in association with the application, the second notifier providing an indication of the verification; and
    a counting component that receives, records, and communicates the first notifier and the second notifier; and
    a management components that receives and analyzes the first notifier and the second notifier, wherein analyzing the first notifier and the second notifier comprises:
    (a) comparing the first notifier to the second notifier to determine whether a date associated with the first notifier and a date associated with the second notifier relative to one another provide an indication that the user device or the wireless telecommunications network was acquired by a user based on, at least in part, the user's ability to utilize the application on the user device using the wireless communications network; and
    (b) calculating a compensation, based on a usage-notifier-incentive system of the network provider to providers of applications, when it is determined that the user device or the wireless telecommunications network was acquired by a user based at least in part on the user's ability to utilize the application, wherein the compensation is provided to providers of the applications from the network provider of the wireless telecommunications network.

13. The system of claim 12, wherein the first notifier includes an application identifier, a source identifier, a source type identifier, an event date of the notifier, an event time of the notifier, or a combination thereof.

14. The system of claim 12, wherein the second notifier includes an application identifier, a source identifier, a source type identifier, an event date of the notifier, an event time of the notifier, or a combination thereof.

15. The system of claim 12, wherein the first notifier is an application-activation notifier, a device-activation notifier, or an execution notifier.

16. The media of claim 6, wherein the notifier is utilized to predict whether a user's selection of the mobile device is related to the application.

* * * * *